United States Patent
Veeramreddi et al.

(10) Patent No.: US 11,588,392 B2
(45) Date of Patent: Feb. 21, 2023

(54) ZERO CURRENT DETECTOR WITH A GATE PRE-CHARGE CIRCUIT

(71) Applicant: TEXAS INSTRUMENTS INCORPORATED, Dallas, TX (US)

(72) Inventors: Srinivas Venkata Veeramreddi, Bengaluru (IN); Subhash Sahni, Dehradun (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 148 days.

(21) Appl. No.: 17/108,028

(22) Filed: Dec. 1, 2020

(65) Prior Publication Data

US 2021/0083565 A1   Mar. 18, 2021

Related U.S. Application Data

(63) Continuation of application No. 16/122,953, filed on Sep. 6, 2018, now Pat. No. 10,855,164.

(51) Int. Cl.
*H02M 1/08*   (2006.01)
*H02M 3/158*   (2006.01)
*H02M 1/00*   (2006.01)

(52) U.S. Cl.
CPC ........... *H02M 1/083* (2013.01); *H02M 3/158* (2013.01); *H02M 1/0009* (2021.05)

(58) Field of Classification Search
CPC .. H02M 1/083; H02M 1/0032; H02M 1/0058; H02M 1/0009; H02M 3/158; Y02B 70/10; G01R 19/175
See application file for complete search history.

(56) References Cited

U.S. PATENT DOCUMENTS

| 6,507,175 B2 | 1/2003 | Susak et al. |
| 2009/0174391 A1* | 7/2009 | Zhang .................. G01R 19/175 324/76.11 |

(Continued)

FOREIGN PATENT DOCUMENTS

CN    105007644 A   * 10/2015

OTHER PUBLICATIONS

Bryson, "Using auto-zero comparator techniques to improve PWM performance", EDN network, 2008, URL: https://www.edn.com/design/power-management-design/4010058/Ulsing auto-sero-comparator-techniques-to-improve-PWM-performance-Part-1-of-2-? utm_souirce=eetimes&utm_medium=relatedcontent (Year:2008).

(Continued)

*Primary Examiner* — Kyle J Moody
*Assistant Examiner* — Jye-June Lee
(74) *Attorney, Agent, or Firm* — Krista Y. Chan; Frank D. Cimino

(57) ABSTRACT

A switch-mode power supply and a zero current detector for use therein. A zero current detector includes an input stage and an output stage. The output stage is coupled to the input stage. The output stage includes a detector output terminal, a first transistor, and a second transistor. The first transistor includes an input terminal and a control terminal. The input terminal is coupled to the detector output terminal. The control terminal is coupled to the input stage. The second transistor includes an input terminal, a control terminal, and an output terminal. The input terminal is coupled to the control terminal of the first transistor. The control terminal is coupled to the input terminal of the second transistor. The output terminal is coupled to ground.

19 Claims, 3 Drawing Sheets

(56) References Cited

U.S. PATENT DOCUMENTS

| | | | | |
|---|---|---|---|---|
| 2011/0291632 A1* | 12/2011 | Yu | ..................... | H02M 3/158 |
| | | | | 323/283 |
| 2013/0307507 A1 | 11/2013 | Li et al. | | |
| 2015/0084605 A1* | 3/2015 | Ho | ................... | H02M 3/1588 |
| | | | | 323/235 |

OTHER PUBLICATIONS

V. Michal, "Inductor Current Zero-Crossing Detector and CCM/DCM Boundary Detector for Integrated High-Current Switched-Mode DC-DC Converters," in IEEE Transactions on Power Electronics, vol. 29, No. 10, pp. 5384-5391, Oct. 2014 (Year: 2014).

* cited by examiner

ZERO CURRENT DETECTOR WITH A GATE PRE-CHARGE CIRCUIT

CROSS-REFERENCE TO RELATED APPLICATIONS

This application is a continuation of U.S. patent application Ser. No. 16/122,953, filed Sep. 6, 2018, which is incorporated by reference herein in its entirety.

BACKGROUND

A switch-mode power supply is an electronic circuit that converts an input direct current (DC) supply voltage into one or more DC output voltages that are higher or lower in magnitude than the input DC supply voltage. A switch-mode power supply that generates an output voltage lower than the input voltage is termed a buck or step-down converter. A switch-mode power supply that generates an output voltage higher than the input voltage is termed a boost or step-up converter.

Some switch-mode power supply topologies include a drive/power transistor coupled at a switch node to an energy storage inductor/transformer. Electrical energy is transferred through the energy storage inductor/transformer to a load by alternately opening and closing the switch as a function of a switching signal. The amount of electrical energy transferred to the load is a function of the ON/OFF duty cycle of the switch and the frequency of the switching signal. Switch-mode power supplies are widely used to power electronic devices, particularly battery powered devices, such as portable cellular phones, laptop computers, and other electronic systems in which efficient use of power is desirable.

SUMMARY

A zero current detector and a switch-mode power supply that uses the zero current detector are disclosed herein. In one example, a switch-mode power supply includes an inductor, a high-side power transistor, a low-side power transistor, a controller, and a zero current detector. The high-side power transistor is coupled to the inductor. The low-side power transistor is coupled to the inductor. The controller is configured to drive the high-side power transistor and the low-side power transistor. The zero current detector is coupled to the inductor and to the controller. The zero current detector is configured to detect a reversal of current flow in the inductor. The zero current detector includes a detection transistor and a pre-charge circuit. The detection transistor is configured to switch responsive to the reversal of current flow in the inductor. The pre-charge circuit is coupled to a control terminal of the detection transistor. The pre-charge circuit is configured to charge the control terminal of the detection transistor while the low-side power transistor is turned off.

In another example, an integrated circuit includes a switch mode power supply controller and a zero current detector coupled to the switch mode power supply controller. The zero current detector includes an input stage and an output stage. The output stage is coupled to the input stage. The output stage includes a detector output terminal, a first transistor, and a second transistor. The first transistor includes an input terminal and a control terminal. The input terminal is coupled to the detector output terminal. The control terminal is coupled to the input stage. The second transistor includes an input terminal, a control terminal, and an output terminal. The input terminal is coupled to the control terminal of the first transistor. The control terminal is coupled to the input terminal of the second transistor. The output terminal is coupled to ground.

In a further example, a zero current detector includes an output node, an input terminal, a first negative (N) channel metal oxide semiconductor field effect transistor (MOSFET), a second N channel MOSFET, and a switch. The first N channel MOSFET is configured to pull down the output node. The second N channel MOSFET is configured to pre-charge a gate terminal of the first N channel MOSFET to a voltage within about 100 millivolts of a threshold voltage of the first N channel MOSFET. The switch is configured to switchably connect a drain terminal of the second N channel MOSFET to the gate terminal of the first N channel MOSFET to pre-charge the gate terminal prior to receiving an inductor discharge voltage signal at the input terminal.

BRIEF DESCRIPTION OF THE DRAWINGS

For a detailed description of various examples, reference will now be made to the accompanying drawings in which.

DETAILED DESCRIPTION

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors. The terms "about" or "approximately" define a range of +/−10% about a specified value. Thus, the recitation "about 10" indicates a range of 9 to 11.

Some switch-mode power supply applications require high efficiency when the power supply is lightly loaded. In such applications, discontinuous conduction mode may be employed to boost efficiency. In discontinuous conduction mode, the current in the output inductor of the switch-mode power supply falls to zero before the inductor is recharged. To facilitate operation in the discontinuous conduction mode, the switch-mode power supply includes a zero current detector that identifies the reversal of current direction in the inductor and provides an indication of the current direction reversal to the power supply controller. If detection of the current direction reversal by the zero current detector is too slow, then the flow of current in the reverse direction causes a loss of efficiency when the power supply is lightly loaded. If slow response of the zero current detector allows the reverse direction current to become too great, then high voltage transients may be generated at the power supply output when the inductor is charged. The high voltage transients can degrade the performance and lead to failure of the switch-mode power supply. It is also desirable that the zero current detector is power efficient so that the detector consumes only a fraction of the power consumed by the overall system when the power supply is lightly loaded.

The zero current detectors disclosed herein improve switch-mode power supply efficiency in lightly loaded applications, by reducing the time needed to detect current reversal in the inductor of the switch-mode power supply. The zero current detector of the present disclosure reduces detection time by pre-charging the control terminal of a transistor that switches to detect current reversal. The pre-charging allows the transistor to switch at smaller reverse currents.

Figure 1:
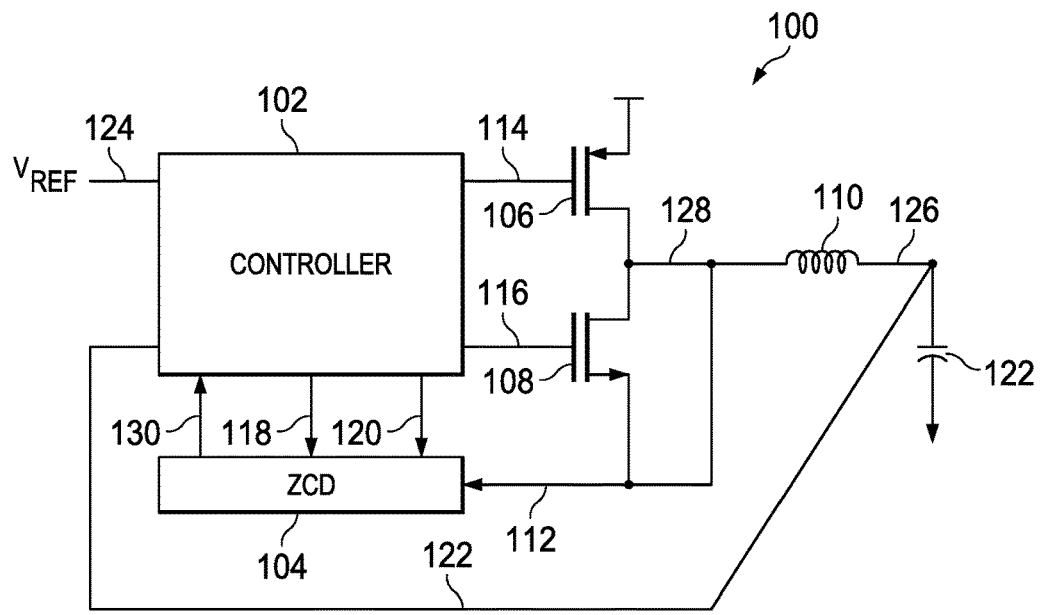
FIG. 1 shows a block diagram of an example of a switch-mode power supply that includes a zero current detector in accordance with the present disclosure.

FIG. 1 shows a block diagram of an example of a switch-mode power supply 100 (a buck converter in this example) that includes a zero current detector in accordance with the present disclosure. The switch-mode power supply 100 includes a controller 102, a zero current detector 104 (alternatively referred to as a zero crossing detector), a high-side power transistor 106, a low-side power transistor 108, and an inductor 110. The high-side power transistor 106 and the low-side power transistor 108 are switched on and off to charge and discharge the inductor 110. The high-side power transistor 106 is turned on to connect the inductor 110 to a power supply, thereby inducing a magnetic field about the inductor 110. The low-side power transistor 108 is turned on to connect the inductor 110 to ground allowing the magnetic field about the inductor 110 to collapse and current from the inductor 110 to flow to a load and/or a capacitor 122. The high-side power transistor 106 may be a positive (P) channel metal oxide semiconductor field effect transistor (MOSFET), and the low-side power transistor 108 may be a negative (N) channel MOSFET. In some implementations of the switch-mode power supply 100, the high-side power transistor 106 may be an N-channel MOSFET.

The controller 102 generates high-side control signal 114 to control the high-side power transistor 106 and low-side control signal 116 to control the low-side power transistor 108. The controller 102 may include circuitry, such as a pulse width modulator, to generate pulses to drive the high-side control signal 114 and the low-side control signal 116, level shifters to shift the pulses to voltages suitable for driving the high-side power transistor 106 and the low-side power transistor 108, and/or gate drivers to generate the currents needed to quickly charge the gate capacitance of the high-side power transistor 106 and the low-side power transistor 108. To regulate the voltage at the output 126 of the switch-mode power supply 100, the controller 102 may compare the feedback signal 122, routed from the load side of the inductor 110, to a reference voltage 124, and apply a difference signal produced by the comparison to control generation of the pulses included in the low-side control signal 116 and the high-side control signal 114 (e.g., to control a pulse width modulator).

When the switch-mode power supply 100 is lightly loaded, the switch-mode power supply 100 operates in discontinuous conduction mode. In discontinuous conduction mode, the low-side power transistor 108 is turned on for a length of time that allows the inductor 110 to completely discharge, and the current flowing in the inductor 110 to drop to zero and reverse direction. To facilitate operation in discontinuous conduction mode, the zero current detector 104 monitors current flow in the inductor 110 to determine when the current flow drops to zero (or reverses direction). The zero current detector 104 is coupled to the controller 102 and to the output node 128 formed at the connection of the inductor 110 to the high-side power transistor 106 and the low-side power transistor 108. The zero current detector 104 detects the point in time of zero current flow in the inductor 110 by monitoring the voltage at the output node 128. On detection of zero current flow in the inductor 110, the zero current detector 104 asserts an output signal 130 that notifies the controller 102 of the zero current flow, and in turn allows the controller 102 to disable the low-side power transistor 108. In some implementations, the zero current detector 104, or some circuits thereof, may be integrated with the controller 102.

Operation of the zero current detector 104 is controlled, in part, by the signal 118 and the signal 120 provided by the controller 102. The signal 120 may be asserted in correspondence with the time intervals in which the low-side power transistor 108 is turned on, and the signal 118 may be asserted in correspondence with the time intervals in which the low-side power transistor 108 is turned off. The zero current detector 104 includes pre-charge circuitry that allows the zero current detector 104 to quickly detect the time of zero current flow in the inductor 110. By reducing the time needed to detect zero current flow in the inductor 110, the zero current detector 104 improves the efficiency of the switch-mode power supply 100, and reduces the likelihood of damage to the switch-mode power supply 100 caused by high voltage transients at the output node 128.

In some implementations of the switch-mode power supply 100, the controller 102, zero current detector 104, high-side power transistor 106, and low-side power transistor 108 may be provided on a same integrated circuit.

Figure 2:
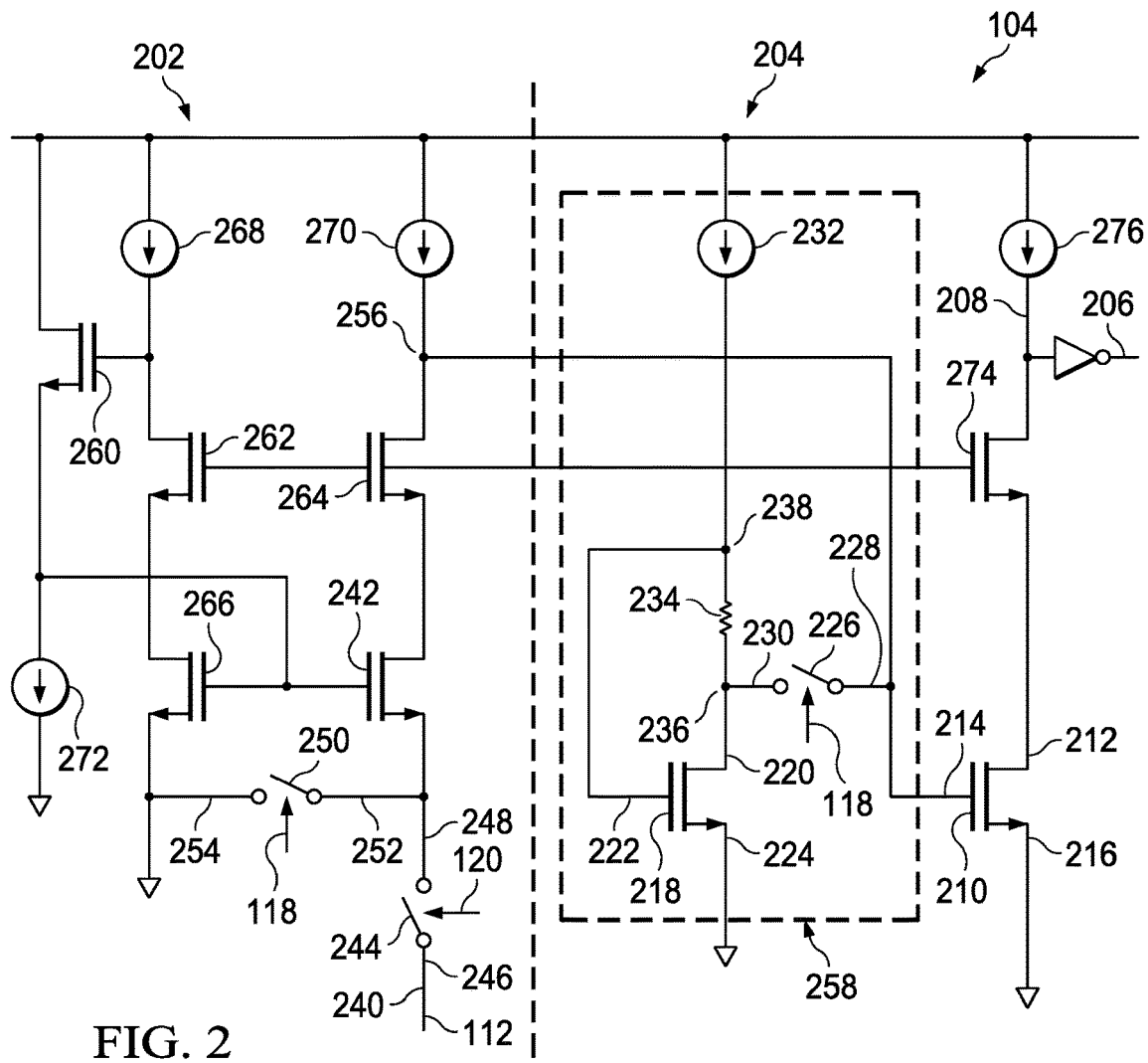
FIG. 2 shows a schematic diagram for an example of a zero current detector in accordance with the present disclosure.

FIG. 2 shows a schematic diagram for an example of the zero current detector 104. The zero current detector 104 includes an input stage 202 and an output stage 204. The input stage 202 receives the voltage signal 112 produced at the output node 128, and the output stage 204 generates the output signal 130 provided to the controller 102. The input stage 202 includes an input terminal 240, a transistor 242, a switch 244, a switch 250, a transistor 260, a transistor 262, a transistor 264, a transistor 266, a current source 268, a current source 270, and a current source 272. The input terminal 240 is coupled to the output node 128, and to a terminal 246 of the switch 244. The switch 244 is coupled to the input terminal 240, to the switch 250, and to the transistor 242. More specifically, the switch 244 includes a terminal 246 that is coupled to the input terminal 240, and includes a terminal 248 that is coupled the switch 250 and to the transistor 242. The switch 244 is controlled by the signal 120 received from the controller 102. Accordingly, if the low-side power transistor 108 is turned on, then the switch 244 is closed to connect the input terminal 240 to the transistor 242. Conversely, when the low-side power transistor 108 is turned off, the switch 244 is open to disconnect the input terminal 240 from the transistor 242.

The switch 250 includes a terminal 252 that is coupled to the terminal 248 of the switch 244, and to the transistor 242, and includes a terminal 254 that is coupled to ground. The switch 250 is controlled by the signal 118 received from the controller 102. Accordingly, if the low-side power transistor 108 is turned off, then the switch 250 is closed to connect the transistor 242 to ground. Conversely, when the low-side power transistor 108 is turned on, the switch 250 is open to disconnect the transistor 242 from ground.

The transistor 242 (also referred to herein as a "detection transistor") controls the output 256 of the input stage 202. The transistor 242 may be an N channel MOSFET. When the switch 250 is closed, the transistor 242 is turned on and the output 256 is pulled down. When the switch 250 is open, and the switch 244 is closed, the voltage of the signal 112 increases as the current in the inductor 110 reverses direction, which in turn causes the transistor 242 to increase in resistance, and the voltage at the output 256 to increase.

The output stage 204 includes a detector output terminal 206, an output node 208, a transistor 210, a pre-charge circuit 258, a transistor 274, and a current source 276. The pre-charge circuit 258 includes a transistor 218 (also referred to herein as an "offset generation transistor"), a switch 226, a current source 232, and a resistor 234. The detector output terminal 206 is coupled to the controller 102 to provide the output signal 130 to the controller 102. The transistor 210 controls the voltage at the output node 208. The transistor 210 may be an N channel MOSFET. The transistor 210 includes an input terminal (e.g., drain terminal) 212 that is coupled to the output node 128, an output terminal (e.g., source terminal) 216 that is coupled to ground, and a control terminal (e.g., gate terminal) 214 that is coupled to the output 256 of the input stage 202 and to the pre-charge circuit 258. When the transistor 210 is turned on, the output node 208 is pulled down to activate the output signal 130 at the detector output terminal 206. When the transistor 210 is turned off, the output node 208 is pulled up to deactivate the output signal 130.

The pre-charge circuit 258 decreases the detection delay of the zero current detector 104 by pre-charging the control terminal 214 of the transistor 210 to a voltage that is less than the threshold voltage (e.g., a gate-source turn-on threshold voltage) of the transistor 210 and higher than ground. For example, the pre-charge circuit 258 may pre-charge the control terminal 214 of the transistor 210 to within about 100 millivolts of the threshold voltage of the transistor 210. By pre-charging the control terminal 214 of the transistor 210, the pre-charge circuit 258 causes the transistor 210 to switch earlier as the signal 112 increases in voltage after the current reversal in the inductor 110. For example, if the threshold voltage of the transistor 210 is 350 millivolts, and the pre-charge circuit 258 pre-charges the control terminal 214 of the transistor 210 to 250 millivolts while the low-side power transistor 108 is turned off, then after the low-side power transistor 108 turns on an increase in voltage of the voltage signal 112 causing the output 256 of the input stage 202 to increase by 100 millivolts will cause the transistor 210 to turn on. On the other hand, if the control terminal 214 of the transistor 210 is not pre-charged, then the voltage at the output 256 of the input stage 202 must increase from about zero volts to 350 millivolts to turn on the transistor 210 resulting in a substantially greater delay in detection of the current reversal.

In the pre-charge circuit 258, the transistor 218, the current source 232, and the resistor 234 generate the pre-charge voltage. The transistor 218 may be an N channel MOSFET. The dimensions of the transistor 218 may the same as the dimensions of the transistor 210. The transistor 218 includes an output terminal (e.g., source terminal) 224 that is coupled to ground, an input terminal (e.g., drain terminal) 220 that is coupled to the resistor 234, and control terminal (e.g., gate terminal) 222 that is coupled to the resistor 234. The voltage generated at the input terminal 220 is used to pre-charge the control terminal 214 of the transistor 210.

The resistor 234 includes a terminal 236 that is coupled to the input terminal 220 of the transistor 218, and a terminal 238 that is coupled to the control terminal 222 of the transistor 218. The terminal 238 of the resistor 234 is also coupled to the current source 232.

The transistor 218 is coupled to the transistor 210 by the switch 226. The switch 226 includes a terminal 230 that is coupled to the input terminal 220 of the transistor 218, and includes a terminal 228 that is coupled to the control terminal 214 of the transistor 210. When the switch 226 is closed, the control terminal 214 of the transistor 210 is pre-charged to the voltage at the input terminal 220 of the transistor 218. The switch 226 is controlled by the signal 118 received from the controller 102. Accordingly, if the low-side power transistor 108 is turned off, then the switch 226 is closed to connect the control terminal 214 of the transistor 210 to the voltage at the input terminal 220 of the transistor 218. Conversely, when the low-side power transistor 108 is turned on, the switch 226 is open to disconnect the control terminal 214 of the transistor 210 from the transistor 218 and allow detection of reverse current in the inductor 110.

Figure 3:
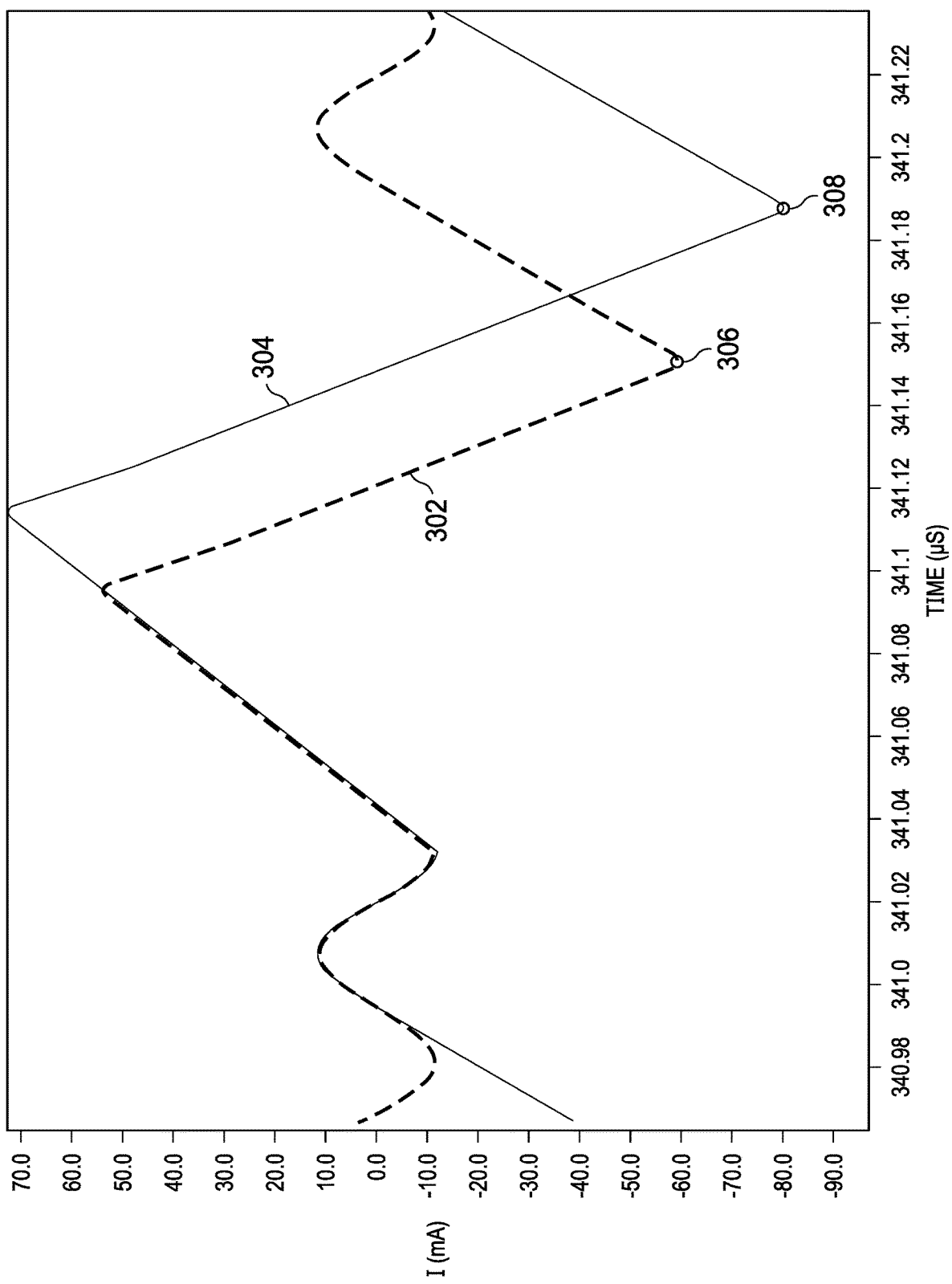
FIG. 3 shows detection performance of an example of a zero current detector in accordance with the present disclosure.

FIG. 3 shows detection performance of an example of a zero current detector 104. The signal 302 represents current in the inductor 110 with the switch-mode power supply 100 including the zero current detector 104. The zero current detector 104 detects reverse current flow in the inductor 110 and signals the controller 102 to turn off the low-side power transistor 108. In this example, the quick detection of reverse current flow in the zero current detector 104 including pre-charging produces a maximum reverse current at 306 of about 59 milli-amperes in the inductor 110. In contrast, in signal 304, an implementation of the zero current detector 104 that lacks pre-charging takes longer to detect reverse current flow in the inductor 110, such that a maximum reverse current of about 80 milli-amperes is produced in the inductor 110 at 308.

Figure 4:
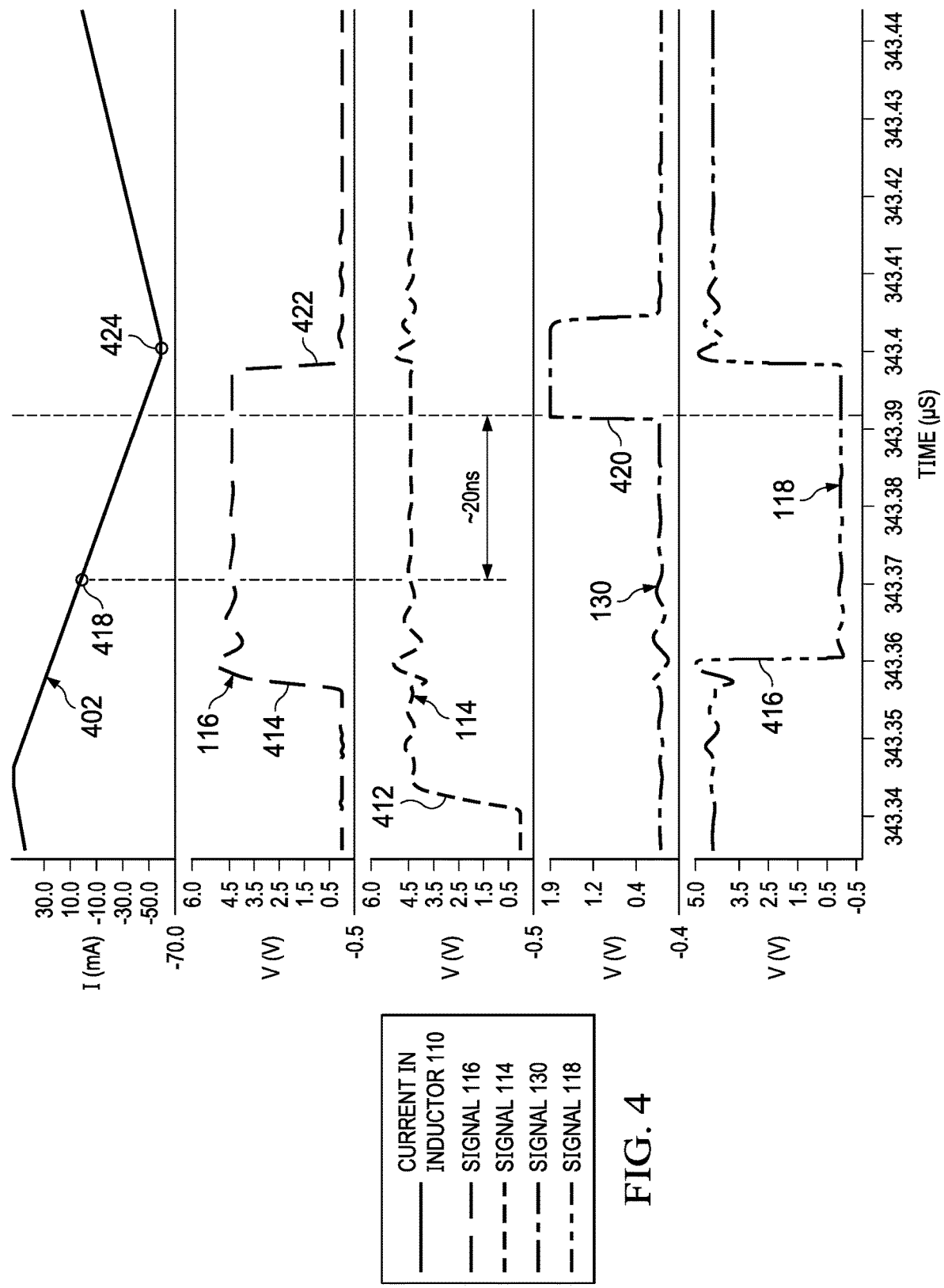
FIG. 4 shows examples of signals generated in an example of a zero current detector in accordance with the present disclosure.

FIG. 4 shows signals generated in an example of the switch-mode power supply 100 that includes zero current detector 104. At 412, the controller 102 deactivates the high-side control signal 114 to turn off the high-side power transistor 106 and current 402 in the inductor 110 begins to fall. At 414, the controller 102 activates the low-side control signal 116 to turn on the low-side power transistor 108. Quickly thereafter, at 416, the controller 102 deactivates the signal 118 to open the switch 250 and the switch 226, and activates the signal 120 to close the switch 244. When the signal 118 is deactivated at 416, the control terminal 214 of the transistor 210 has been pre-charged to a voltage near the threshold of the transistor 210. The current in the inductor 110 falls to zero at about 418, and after a delay of about 20 nanoseconds, the transistor 210 turns on to assert the output signal 130 at 420. Responsive to assertion of the output signal 130, the controller 102 deactivates the low-side control signal 116 at 422 to turn off the low-side power transistor 108, and the current in the inductor 110 reverses direction at 424.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A power supply comprising:
   a high-side switch and a low-side switch coupled in series;
   an output node between the high-side switch and the low-side switch;
   a controller coupled to the high-side switch and the low-side switch; and
   a zero current detector coupled to the output node and to the controller, wherein the zero current detector includes:
      a first transistor and a second transistor coupled in series, wherein the second transistor includes a gate; and
      a pre-charge circuit coupled to the gate of the second transistor, wherein the pre-charge circuit is configured to pre-charge the gate of the second transistor to a voltage less than a threshold voltage of the second transistor.

2. The power supply of claim 1, wherein:
   the zero current detector includes an inverter configured to provide a zero current signal to the controller; and
   the first transistor and the second transistor are coupled in series between the inverter and ground.

3. The power supply of claim 1, wherein:
   the controller is coupled to provide, to the zero current detector, a switching signal indicating whether a first switch selected from a group consisting of the high-side switch and the low-side switch is off; and
   the pre-charge circuit includes a second switch coupled to the gate of the second transistor and configured to switch based on the switching signal.

4. The power supply of claim 3, wherein the pre-charge circuit includes:
   a current source;
   a resistor coupled between the current source and the second switch; and
   a third transistor coupled between the second switch and ground, wherein the third transistor includes a gate coupled between the current source and the resistor.

5. The power supply of claim 1, wherein the zero current detector includes an input stage that includes:
   a first output coupled to a gate of the first transistor; and
   a second output coupled to the gate of the second transistor in parallel with the pre-charge circuit.

6. The power supply of claim 5, wherein the input stage includes:
   a first current source coupled to the second output;
   a first switch coupled to the output node of the power supply; and
   a third transistor and a fourth transistor coupled in series between the first current source and the first switch.

7. The power supply of claim 6, wherein the input stage includes:
   a second current source;
   a fifth transistor and a sixth transistor coupled in series between the second current source and ground, wherein the fifth transistor includes a gate coupled to a gate of the third transistor and the sixth transistor includes a gate coupled to a gate of the fourth transistor; and
   a second switch coupled between the first switch and the sixth transistor.

8. The power supply of claim 1, wherein the pre-charge circuit is configured to pre-charge the gate of the second transistor to the voltage based on the low-side switch being off.

9. The power supply of claim 1 further comprising:
   a power supply output; and
   an inductor coupled between the output node and the power supply output.

10. A zero current detector comprising:
    an input configured to receive a voltage signal;
    an output configured to produce a zero current detection signal based on the voltage signal;
    a first transistor and a second transistor coupled in series;
    an input stage coupled to the input, the first transistor, and the second transistor and configured to provide a first control signal to the first transistor and a second control signal to the second transistor; and
    a pre-charge circuit coupled to the second transistor in parallel with the input stage.

11. The zero current detector of claim 10 further comprising an inverter coupled to the output, wherein the first transistor and the second transistor are coupled in series between the inverter and ground.

12. The zero current detector of claim 10, wherein:
    the second transistor includes a gate; and
    the pre-charge circuit is configured to pre-charge the gate of the second transistor to less than a threshold voltage of the second transistor.

13. The zero current detector of claim 10, wherein:
    the zero current detector is configured to be coupled to a switching power supply controller;
    the input is a first input;
    the zero current detector includes a second input coupled to the input stage and configured to receive a signal indicating whether a power transistor is off; and
    the pre-charge circuit is configured to pre-charge the second transistor to less than a threshold voltage of the second transistor based on the signal indicating that the power transistor is off.

14. The zero current detector of claim 10, wherein the pre-charge circuit includes:
    a switch coupled to the second transistor;
    a current source;
    a resistor coupled between the current source and the switch; and
    a third transistor coupled between the resistor and ground, wherein the third transistor includes a gate coupled between the current source and the resistor.

15. The zero current detector of claim 10, wherein the input stage includes:
    a first current source coupled to the second transistor to provide the second control signal;
    a first switch coupled to the input of the zero current detector to receive the voltage signal; and
    a third transistor and a fourth transistor coupled in series between the first current source and the first switch.

16. The zero current detector of claim 15, wherein the input stage includes:
    a second current source;
    a fifth transistor and a sixth transistor coupled in series between the second current source and ground, wherein the fifth transistor includes a gate coupled to a gate of the third transistor and the sixth transistor includes a gate coupled to a gate of the fourth transistor; and
    a second switch coupled between the first switch and the sixth transistor.

17. An integrated circuit, comprising:
    a power supply controller that includes:
       a control output configured to couple to a power supply switch; and an output configured to provide a signal that indicates whether the power supply switch is off; and a zero current detector coupled to the power supply controller that includes:

a first transistor and a second transistor coupled in series, wherein the second transistor includes a gate; and a pre-charge circuit coupled to the gate of the second transistor and configured to pre-charge the gate of the second transistor based on the signal indicating that the power supply switch is off.

18. The integrated circuit of claim 17, wherein the pre-charge circuit includes:

a switch coupled to the second transistor and configured to switch in response to the signal indicating that the power supply switch is off;

a current source;

a resistor coupled between the current source and the switch; and a third transistor coupled between the resistor and ground, wherein the third transistor includes a gate coupled between the current source and the resistor.

19. The integrated circuit of claim 17, wherein the pre-charge circuit is configured to pre-charge the gate of the second transistor to less than a threshold voltage of the second transistor.

* * * * *